(12) United States Patent
Lisowski et al.

(10) Patent No.: US 9,434,311 B2
(45) Date of Patent: Sep. 6, 2016

(54) LOW REFLECTANCE GLARE OPTIC

(71) Applicant: Gentex Corporation, Zeeland, MI (US)

(72) Inventors: Michael F. Lisowski, Holland, MI (US); Danny L. Minikey, Jr., Fenwick, MI (US); Henry A. Luten, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 249 days.

(21) Appl. No.: 14/185,334

(22) Filed: Feb. 20, 2014

(65) Prior Publication Data

US 2014/0268350 A1   Sep. 18, 2014

Related U.S. Application Data

(60) Provisional application No. 61/789,903, filed on Mar. 15, 2013.

(51) Int. Cl.
*G02B 5/08* (2006.01)
*G02B 17/00* (2006.01)
*B60R 1/08* (2006.01)
*B60R 1/12* (2006.01)

(52) U.S. Cl.
CPC .............. *B60R 1/083* (2013.01); *B60R 1/088* (2013.01); *B60R 1/12* (2013.01); *B60R 2001/1223* (2013.01)

(58) Field of Classification Search
CPC ......... B60R 1/083; B60R 1/12; B60R 1/088; B60R 2001/1223
USPC ........ 359/602–606, 839, 850, 860, 265–275, 359/608, 609; 362/494; 349/11
See application file for complete search history.

(56) References Cited

U.S. PATENT DOCUMENTS

| | | |
|---|---|---|
| 5,422,756 A | 6/1995 | Weber et al. |
| 5,631,089 A | 5/1997 | Center et al. |
| 5,760,962 A | 6/1998 | Schofield et al. |

(Continued)

FOREIGN PATENT DOCUMENTS

WO   9517303 A1   6/1995

OTHER PUBLICATIONS

Patent Cooperation Treaty, International Searching Authority, International Search Report, Written Opinion of the International Searching Authority and Notification of Transmittal, Jun. 10, 2014, 6 Pages.

(Continued)

*Primary Examiner* — Scott J Sugarman
*Assistant Examiner* — Mustak Choudhury
(74) *Attorney, Agent, or Firm* — Price Heneveld LLP; Scott P. Ryan

(57) ABSTRACT

A rearview assembly is disclosed for use in a vehicle for providing a rearward view from the vehicle. In one example, the rearview assembly includes at least one substrate having a partially transmissive coating and a light sensor proximate the at least one substrate. The rearview assembly further includes a secondary optic. The secondary optic has a first surface facing outward toward the at least one substrate and a second surface facing inward toward the light sensor. Vertical flutes extend uniformly along the first surface and horizontal flutes extend uniformly along the second surface. The secondary optic is configured to control a field of view of the light sensor.

20 Claims, 10 Drawing Sheets

(56) References Cited

U.S. PATENT DOCUMENTS

| | | |
|---|---|---|
| 6,193,378 B1 | 2/2001 | Tonar et al. |
| 6,447,123 B2 | 9/2002 | Tonar et al. |
| 7,543,946 B2 * | 6/2009 | Ockerse .................. B60R 1/088 250/216 |
| 8,201,800 B2 | 6/2012 | Filipiak |
| 8,210,695 B2 | 7/2012 | Roth et al. |
| 8,264,761 B2 | 9/2012 | Cammenga et al. |
| 8,614,845 B2 | 12/2013 | Tonar et al. |
| 8,620,523 B2 | 12/2013 | Nelson et al. |
| 2012/0330504 A1 | 12/2012 | Nelson et al. |
| 2013/0032704 A1 | 2/2013 | Fish, Jr. et al. |

OTHER PUBLICATIONS

Barry K. Nelson, et al., Entitled "Light Sensor", U.S. Appl. No. 13/764,971, filed Feb. 12, 2013.

* cited by examiner

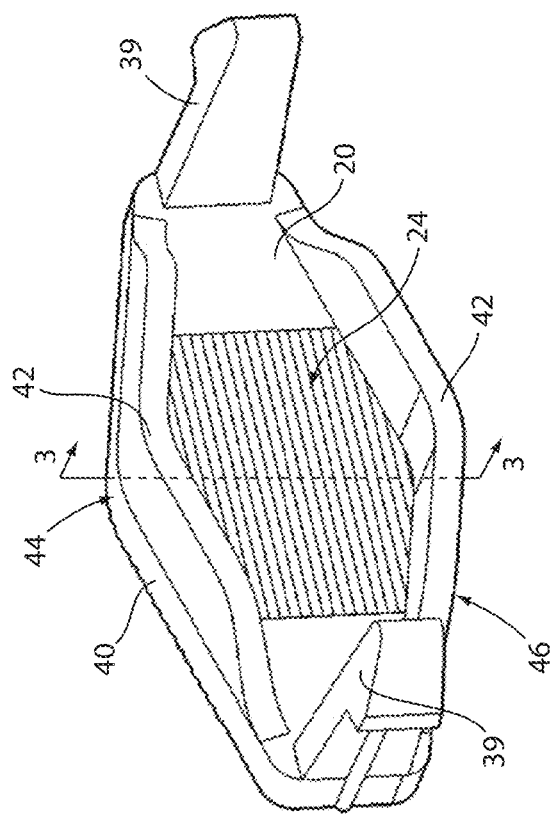
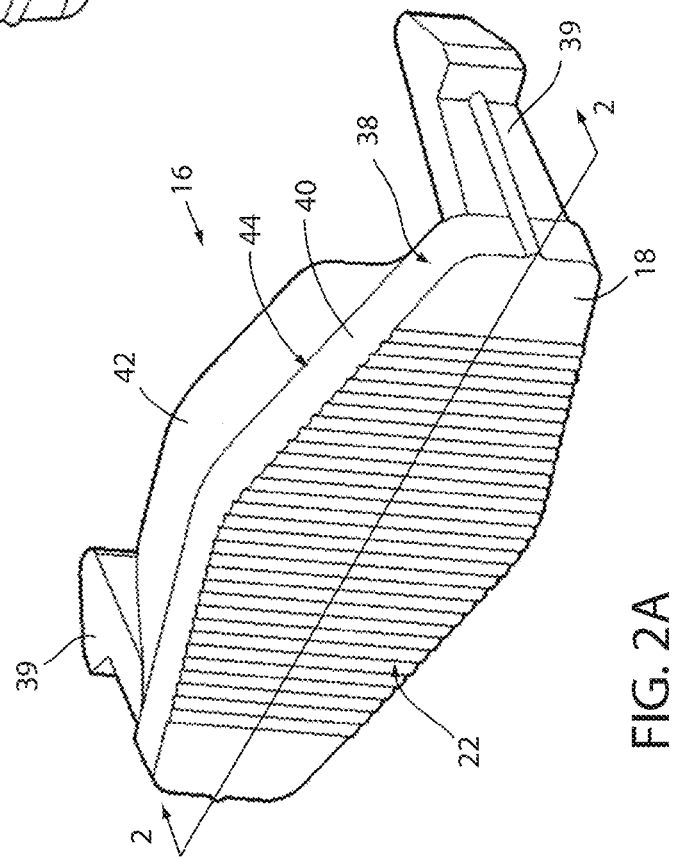
FIG. 2B
FIG. 2A

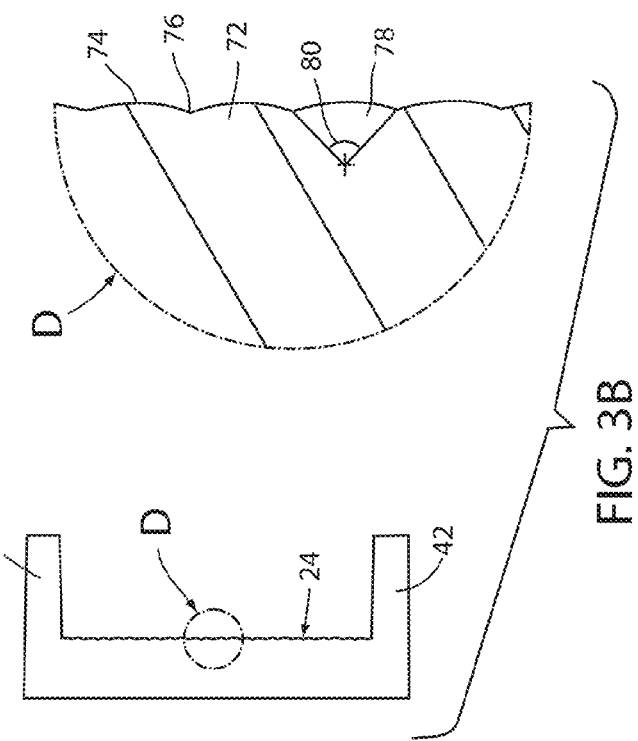
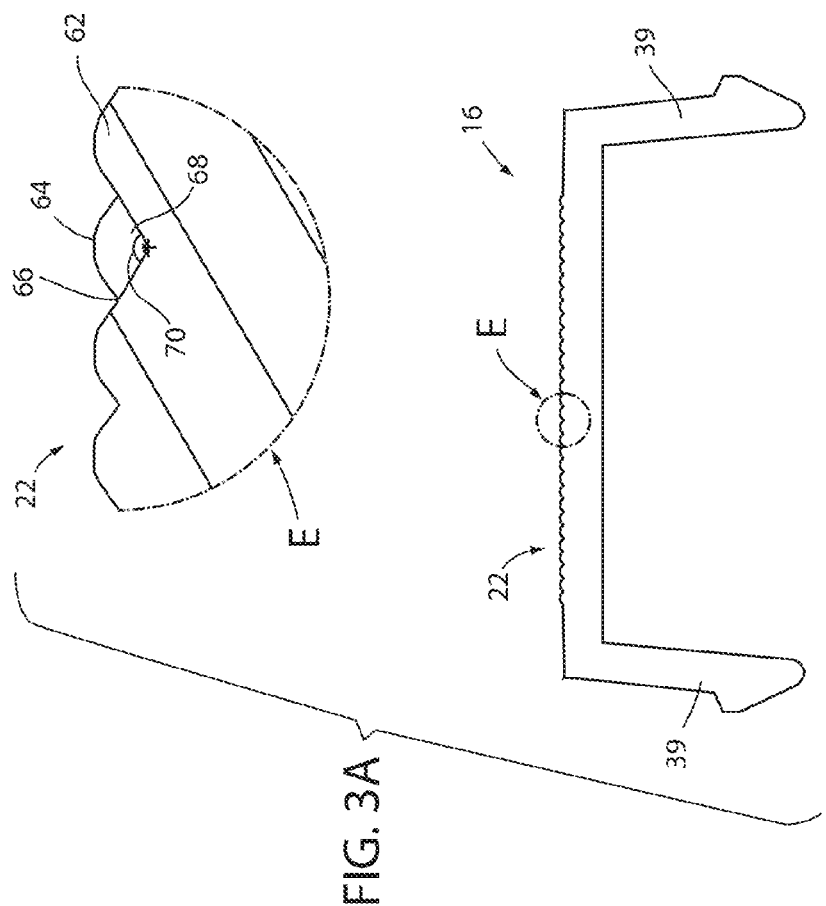
FIG. 3A
FIG. 3B

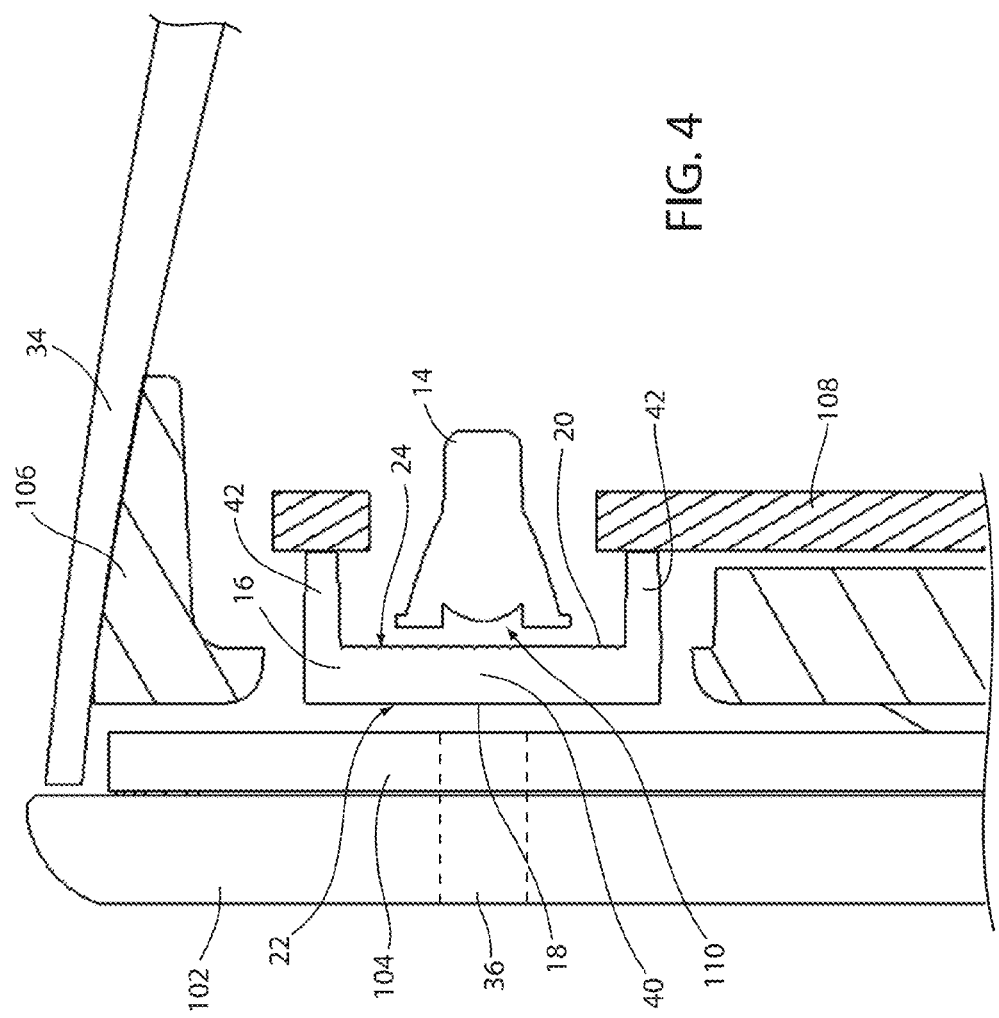

US 9,434,311 B2

LOW REFLECTANCE GLARE OPTIC

CROSS-REFERENCE TO RELATED APPLICATIONS

The present application claims the benefit of the U.S. Provisional Patent Application No. 61/789,903 filed Mar. 15, 2013, under 35 U.S.C. 119(e); the entire content of which is incorporated herein by reference.

BACKGROUND

The present disclosure generally relates to a glare optic for a rearview assembly for a vehicle, and more particularly relates to a secondary optic for a rearview assembly for a vehicle.

SUMMARY

One aspect of the present disclosure includes a rearview assembly for use in a vehicle for providing a rearward view from the vehicle. In one implementation, the rearview assembly includes at least one substrate having a partially transmissive coating and a light sensor proximate the at least one substrate. The rearview assembly also includes a secondary optic. The secondary optic has a first surface facing outward toward the at least one substrate and a second surface facing inward toward the light sensor. Vertical flutes extend uniformly along the first surface and horizontal flutes extend uniformly along the second surface. The secondary optic is configured to control a field of view of the light sensor.

Another aspect of the present disclosure provides for a rearview assembly for use in a vehicle for providing a rearward view from the vehicle. The rearview assembly includes a first substrate and a second substrate. The second substrate includes a partially transmissive coating. The assembly further includes a light sensor disposed proximate the second substrate and a secondary optic disposed between the second substrate and the light sensor. The secondary optic includes a first surface facing outward toward the second substrate and a second surface facing inward toward the light sensor. The secondary optic controls a field of view of light received by the light sensor, and the secondary optic includes a reflectance of less than 30 percent in the direction outward toward the second substrate.

Another aspect of the present disclosure provides for a rearview assembly for use in a vehicle. The assembly includes a housing configured to be mounted to the vehicle. A rearview element is disposed in the housing and provides rearward view from the vehicle. The rearview element includes at least one substrate having a window formed therein. A light sensor is further disposed in the housing proximate the at least one substrate and has a sensory surface aligned with the window. The assembly further includes a secondary optic disposed between the at least one substrate and the light sensor. The secondary optic includes a first surface facing outward toward the at least one substrate and a second surface facing inward toward the light sensor. The first surface includes a plurality of vertical flutes and the second surface includes a plurality of horizontal flutes.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 2A is a front perspective view of a secondary optic of a rearview assembly in accordance with the present disclosure;

FIG. 2B is a rear perspective view of a secondary optic of a rearview assembly in accordance with the present disclosure;

FIG. 3A is a cross-sectional view of the secondary optic along section line 2-2 as shown in FIG. 2A in accordance with the present disclosure;

FIG. 3B is a cross-sectional view of the secondary optic along section line 3-3 as shown in FIG. 2B in accordance with the present disclosure;

FIG. 4 is a partial cross-sectional view of the rearview assembly along section line 1-1 as shown in FIG. 1 in accordance with the present disclosure;

DETAILED DESCRIPTION

Figure 1:
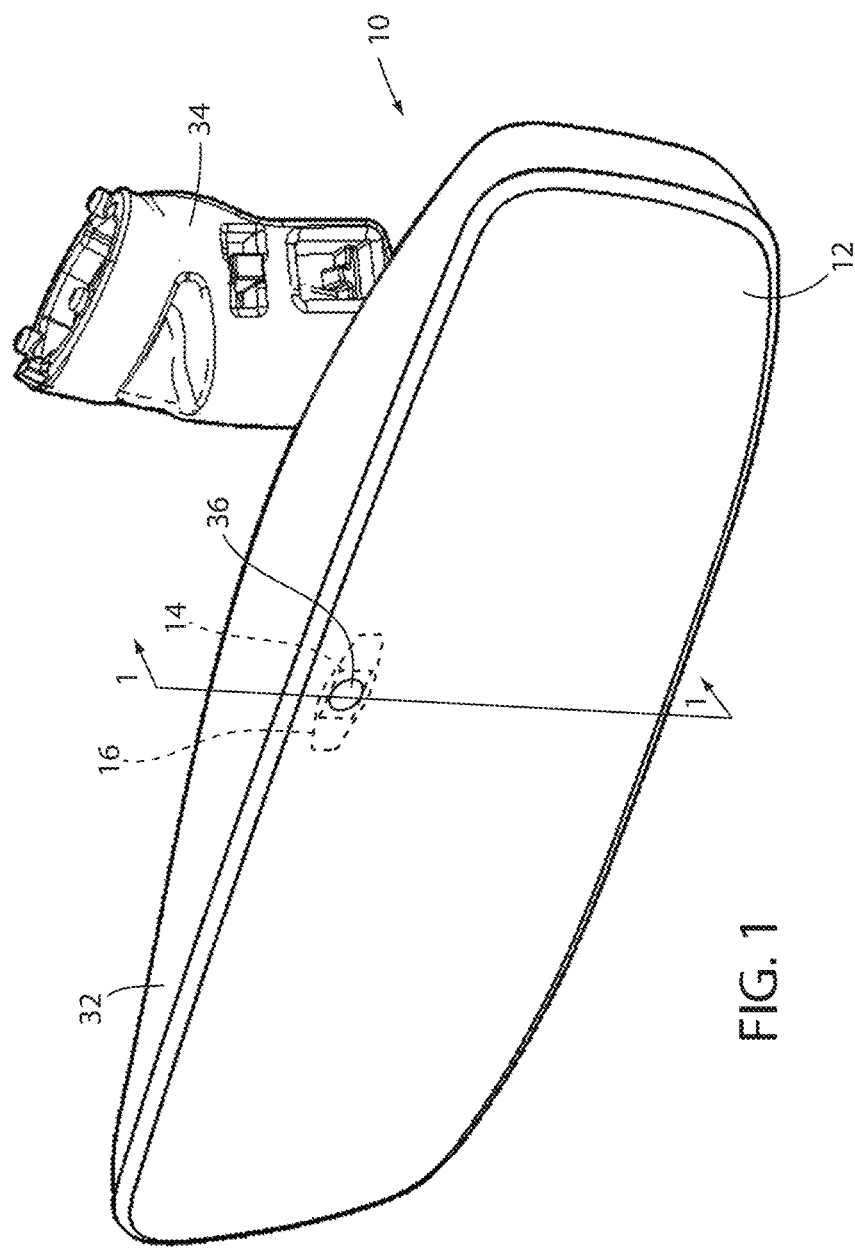
FIG. 1 is a perspective view of one embodiment of a rearview assembly in accordance with the present disclosure.

For purposes of description herein, the terms "upper," "lower," "right," "left," "rear," "front," "vertical," "horizontal," and derivatives thereof shall relate to the disclosure as oriented in FIG. 1 and generally relative to gravity or a horizon. However, it is to be understood that the disclosure may assume various alternative orientations, except where expressly specified to the contrary. It is also to be understood that the specific devices and processes illustrated in the attached drawings, and described in the following specification are simply exemplary embodiments of the concepts defined in the appended claims. Hence, specific dimensions and other physical characteristics relating to the embodiments disclosed herein are not to be considered as limiting, unless the claims expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Referring to FIGS. 1-2B, a rearview assembly 10 for use in a vehicle is illustrated and is operable to provide a rearward view from the vehicle to an occupant or driver of the vehicle. The rearview assembly 10 includes at least one substrate 12 that includes a partially transmissive coating and a light sensor 14 proximate the at least one substrate 12. A secondary optic 16 is further disposed in the assembly 10. The secondary optic 16 includes a first surface 18 facing outward toward the at least one substrate 12 and a second surface 20 facing inward toward the light sensor 14. A plurality of vertical flutes 22 are disposed proximate the first surface 18 and a plurality of horizontal flutes 24 are disposed proximate the second surface 20. The vertical flutes 22 and the horizontal flutes 24 of the secondary optic 16 are configured to control a field of view of the light sensor 14.

Referring to the embodiment generally illustrated in FIG. 1, the rearview assembly includes the at least one substrate 12 disposed in a housing 32. The housing 32 is operably coupled to a rearview device mount 34, sometimes also known as a "channel mount" or "die cast piece." When implemented in an interior of a vehicle, the rearview device mount adjustably supports the rearview assembly 10 in a cantilevered fashion such that the assembly 10 projects into a passenger compartment of the vehicle for use by an occupant of the vehicle. The rearview assembly 10 of the present disclosure may be used with a variety of mounts which are configured for engagement with a variety of rearview devices including prism-type mirrors, electrochromic mirrors, video based displays, and combinations thereof.

The secondary optic 16 is disposed in the housing 32 behind the at least one substrate 12. A window 36 is formed in the at least one substrate 12 and is configured to allow light to pass through the at least one substrate 12. The window 36 is configured such that light is allowed to pass through the at least one substrate 12 through any form of aperture, opening, or partially transmissive surface configured to allow light to be transmitted therethrough. The light may comprise a glare light corresponding to light emitted from at least one headlight of a trailing vehicle.

The secondary optic is configured to receive the light passing through the window 36. The window and/or the secondary optic 16 may include one or more partially transmissive filters, and in some implementations may include a thin-film stack. For example, a neutral density filter of a film type may be incorporated on at least one surface of the window 36. The neutral density filter may be implemented by injection molding a thermoplastic material and control a dynamic range of the light that passes through the window 36. To further control the light that passes through the window 36 and infrared (IR) filter may also be similarly implemented. Each of the IR filter and the neutral density filter may be printed on a surface of the at least one substrate 12 or molded into the secondary optic 16.

In reference to the one or more partially transmissive filters and various other elements introduced in this disclosure, U.S. Pat. Nos. 6,447,123, 6,193,378 and application Ser. No. 09/602,919 are hereby incorporated in their entireties. The window 36 formed in the at least one substrate 12 may further comprise coatings including a plurality of surface stack layers. A surface stack layer may include a layer of a platinum group metal (PGM) (i.e. iridium, osmium, palladium, platinum, rhodium, and ruthenium). In some configurations, light rays impinging upon the secondary optic 16 and the light sensor 14 may pass through the at least one substrate 12, a first surface stack, and a second surface stack. In some implementations, light may further pass through an electro-optic medium, and, finally, a second substrate. The platinum group metal functions to impart continuity in a third surface conductive electrode, thereby, reducing electro-optic medium coloring variations associated with the window 36. The IR filter may be constructed to selectively filter infrared light from reaching the light sensor 14. Such a filter could be constructed using an electrochromic element having electrochromic species that absorb IR radiation. The various filters described in this disclosure may be combined to provide light to the sensor 14 over a range of the visible light spectrum.

Referring now to FIGS. 2A and 2B, front and rear perspective views of the secondary optic 16 are illustrated. The secondary optic 16 includes a substantially planar construction corresponding to the first surface 18. In this example, the secondary optic 16 includes an outer periphery 38 having a generally diamond-shaped configuration. Though a diamond configuration is demonstrated in this particular implementation, the outer periphery 38 may have any shape, for example rounded, polygonal, or any combination thereof. A plurality of brackets or snaps 39 extend from the second surface 20 and are configured to operably couple the secondary optic 16 to a base plate or support structure. In a particular implementation, the plurality of snaps 39 may be configured to couple the secondary optic 16 to a printed circuit board (PCB) as later described in reference to FIG. 4.

The first surface 18 includes a front surface facing outward toward the at least one substrate 12. The plurality of vertical flutes 22 are be formed on the front surface 18. Each of the vertical flutes 22 includes a semi-cylindrical form having a free form curved profile surface protruding outward from the front surface 18 toward the at least one substrate 12. The vertical flutes 22 extend across the front surface 18 such that the light projected through the window 36 is received by the vertical flutes 22. The vertical flutes 22 are uniformly disposed across the front surface 18 and are aligned with the window 36 such that the light transmitted into a body portion 40 is received by the vertical flutes 22. The light received by the vertical flutes 22 is transmitted through the body portion 40 of the secondary optic and outward through the horizontal flutes 24.

The second surface 20 includes a rear surface 20 facing inward toward the light sensor 14. The plurality of horizontal flutes 24 are formed on the rear surface 20. Each of the horizontal flutes 24 includes a semi-cylindrical form having a curved profile surface protruding outward from the rear surface 20 toward the light sensor 14. The horizontal flutes 24 extend across the rear surface 20 such that the light transmitted through the body portion 40 is emitted toward the light sensor 14. The horizontal flutes 24 are uniformly disposed across the rear surface 20 and are aligned with the light sensor 14 such that the light transmitted through the body portion 40 is projected by the horizontal flutes 24 across a sensory surface of the light sensor.

As demonstrated later in FIGS. 4 and 7, the light sensor 14 is positioned relative to the horizontal flutes 24 such that the light emitted from the horizontal flutes is received across the sensory surface of the light sensor 14. The secondary optic 16 may further comprise a plurality of stiffening ribs 42 extending inward along a top portion 44 and a bottom portion 46 of the outer periphery 38. The ribs 42 are configured to extend inward toward the light sensor 14 from the rear surface and stiffen the secondary optic such that the snaps 39 are preloaded for coupling to a base plate or support structure.

The combined orientations of the vertical flutes 22 and the horizontal flutes 24 are configured such that the light received by the vertical flutes 22 to cause a limited reflection outward through the at least one substrate such that the reflection is nearly invisible when viewing the at least one substrate. The novel configuration of the vertical and horizontal flutes 22, 24 limits the reflectance of the secondary optic 16. For example, the reflectance of the secondary optic may be reduced to less than 35%. In some examples, the reflectance is reduced to less than 30% or even less than 10%. In such examples, the secondary optic only reflects a reduced percentage of light received back outward toward a viewer of the at least one substrate 12.

The limited reflectance of the secondary optic 16 serves to provide a uniform view of the rearview display substantially clear of shadows or discontinuities in reflection proximate the window 36 and the secondary optic 16. In some implementations, the at least one substrate may comprise a first substrate and a second substrate to form an electro-chromatic mirror assembly. When implemented in an electro-chromatic mirror assembly, the secondary optic provides for a uniform mirrored display to be reflected back to a viewer without variations in the reflectance of a mirrored surface of the electro-chromatic mirror assembly.

Though the reflectance of the secondary optic 16 is described as being less than 35%, in some examples the secondary optic 16 has a reflectance of less than 20%. In some exemplary implementations, a reflectance of the secondary optic 16 is reduced to less than 10% or less than 5%. In such implementations the uniformity of the display, for example a mirror display or a video display, maybe displayed to a viewer uniformly without any blurred, discontinuous, or darkened portions being visually evident proximate a secondary optic, for example a secondary optic 16. The various implementations of the secondary optic 16 including the particular geometry of the vertical and horizontal flutes 22, 24 may serve to limit the reflectance of the secondary optic 16 in accordance with the disclosure.

In some implementations, the vertical flutes 22 and the horizontal flutes 24 are formed on the front and rear surfaces 18, 20 of the secondary optic 16 from a uniform polymeric and optically transmissive material. The secondary optic 16 may be constructed from any of a variety of polymeric materials, including a clear polycarbonate. Examples of such materials can be found in U.S. Pat. No. 8,614,845 which is included herein by reference in its entirety. Though the vertical and horizontal flutes 22, 24 are described as being formed on the front and rear surfaces 18, 20 of the secondary optic 16, the vertical and horizontal flutes 22, 24 may correspond to additional optic assemblies that may be used in combination with one or more secondary optics. It may be understood that various combinations of components including vertical and horizontal flutes may be combined to form a secondary optic similar to that discussed herein without departing from the spirit of the disclosure.

Referring FIGS. 3A and 3B, cross-sectional views of the secondary optic sectioned along cross-section lines 2-2 and 3-3 are illustrated demonstrate further details of the vertical and horizontal flutes 22, 24 respectively. For clarity, each of the elements referenced numerically and symbolically may correspond to other similar elements introduced throughout this disclosure. The vertical flutes 22 of the secondary optic 16 are shown relative to the plurality of snaps 39 and are further illustrated in cutout section E. Each of the vertical flutes 22 forms a semi-cylindrical portion 62 and a curved surface profile 64. The vertical flutes 22 further comprise tangential line portions intersecting at an angled trough 66. The curved surface profile 64 corresponds to a first base radius 68 of the semi-cylindrical portion 62. The semi-cylindrical portions 62 further comprise a first arc angle 70 denoting the extent of the angular arc of the semi-cylindrical portion. In this implementation, the first base radius 68 is approximately 0.25 mm and the first arc angle 70 is approximately 78 degrees.

The horizontal flutes 24 are shown relative to the plurality of stiffening ribs 42 and are further illustrated in cutout section D. Each of the horizontal flutes 24 includes a semi-cylindrical portion 72 and a curved surface profile 74. Each of the horizontal flutes 24 further intersects at an angled trough 76. The curved surface profile 74 corresponds to a second base radius 78 of the semi-cylindrical portion 72. The semi-cylindrical portions 72 further comprise a second arc angle 80 denoting the angular extent of the arc of the semi-cylindrical portion. In this implementation, the second base radius 78 is approximately 0.55 mm and the second arc angle 80 is approximately 34.7 degrees.

Though particular dimensions of the various radii and arcs are discussed, the dimensions discussed herein may vary widely and may depend on the particular application to which they apply. In some implementations, the first base radius 68 may range at least 100% in length. In some implementations, the first base radius 68 may vary from 50 nm to 10 mm. The second base radius 78 may also range at least 100% in length. In some implementations, the second base radius may vary from 100 nm to 20 mm. In at least one exemplary implementation, the second base radius 78 is larger than the first base radius 68. Further, a ratio of the first base radius 68 to the second base radius 78 may vary from approximately 1 to 10 and in some cases, may vary from 1.1 to 3.1.

The first and second arc angles 70, 80 may vary at least 100%. In some implementations, the first arc angle 70 may vary from 20 to 120 degrees. The second arc angle 80 may vary from 10 to 90 degrees. Each of the first and second radii 68, 78 and the first and second arc angles 70, 80 may vary based on a particular implementation of the secondary optic 16. In general, the specific geometry of the vertical and horizontal flutes 22, 24 may vary based on a particular geometry of the at least one substrate 12, the light sensor 14 and the relation of the secondary optic 16 therebetween.

Referring now to FIG. 4, a cross-sectional view of the rearview assembly is shown across section line 1-1. The housing 34 is adjacent a first substrate 102 and a second substrate 104 corresponding to the at least one substrate 12. A backplate 106 is disposed in the housing approximately coplanar with the front surface 18 of the secondary optic 16. In this example, the secondary optic 16 is operably coupled to a PCB 108 by the plurality of snaps 39. In this view, each of the plurality of snaps 39 is hidden by the cross-sectional cutout across section line 1-1. The light sensor 14 is coupled to the PCB 108 and in electrical communication with one or more circuits of the PCB 108. A support structure of the light sensor 14 is also hidden by the cross-sectional cutout.

The window 36 is configured to allow light to pass through the first substrate 102 and the second substrate 104. The light transmitted through the first substrate 102 and the second substrate 104 is received by the vertical flutes 22 of front surface 18 of the secondary optic 16 and transmitted through a body portion 40 to the rear surface 20. The light is then emitted from the horizontal flutes 24 of the rear surface 20 and received by the sensory surface 110 of the light sensor 14.

Figure 5:
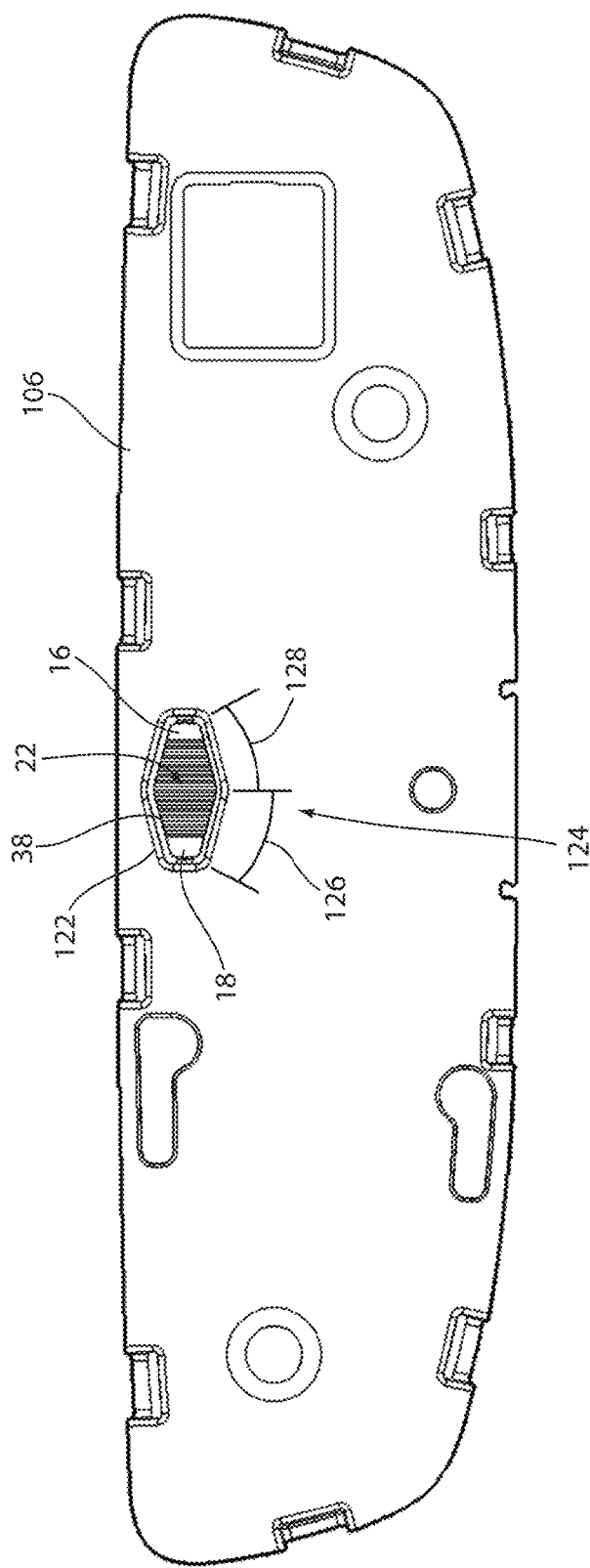
FIG. 5 is a partial front plan view of the secondary optic of a rearview assembly in accordance with the present disclosure.

Referring now to FIG. 5, a front view of the backplate 106 is shown including the secondary optic 16. The secondary optic 16 is disposed in an opening 122 that complements the profile of the outer periphery 38. The at least one substrate 12 is not depicted in this view to demonstrate the vertical flutes 22 of the secondary optic 16. In the implementation described in reference to FIG. 3A, the geometry of the semi-cylindrical portions 62 including the first base radius 68 and the first arc angle 70 are configured such a horizontal field of view 124 extends in a rearward direction with respect to a normal forward operating direction of the vehicle and corresponds to a normal surface vector extending from the front surface 18.

A first angle 126 of the horizontal field of view 124 extends along a first direction towards a port side of the vehicle and a second angle of 128 of the horizontal field of view 124 extends along a second direction towards a starboard side of the vehicle. The first angle 126 is approximately 35 degrees from the normal surface vector extending from the front surface 18. The second angle 128 is approximately 35 degrees from the normal surface vector extending from the front surface 18. The first angle 126 and the second angle 128 may designate a total horizontal field of view of approximately 70 degrees. In this example the first and second angles 126, 128 correspond to the same angle. However, in some implementations the first angle 126 may correspond to a different angle than the second angle 128. Though the first angle 126 and the second angle 128 of the horizontal field 124 of view are specifically discussed herein, an angle of the first angle and the second angle of a horizontal field of view may generally be greater than 25 degrees, and in some implementations may be greater than 30 degrees. In an exemplary implementation, an angle of the first angle and the second angle may be greater than or equal to approximately 35 degrees.

The horizontal field of view 124 is configured such that a glare light may be received from a rear portion of the vehicle, for example a rear windshield. The first and second angles 126, 128 of the horizontal field of view 124 may vary based on the particular geometry for the particular design criteria for a particular application. Though a total horizontal field of view 124 in this implementation is approximately 70 degrees in the rearward direction in relation to the vehicle, a horizontal field of view may vary widely. For example, the horizontal field of view may range from 10 to 180 degrees.

Figure 6:
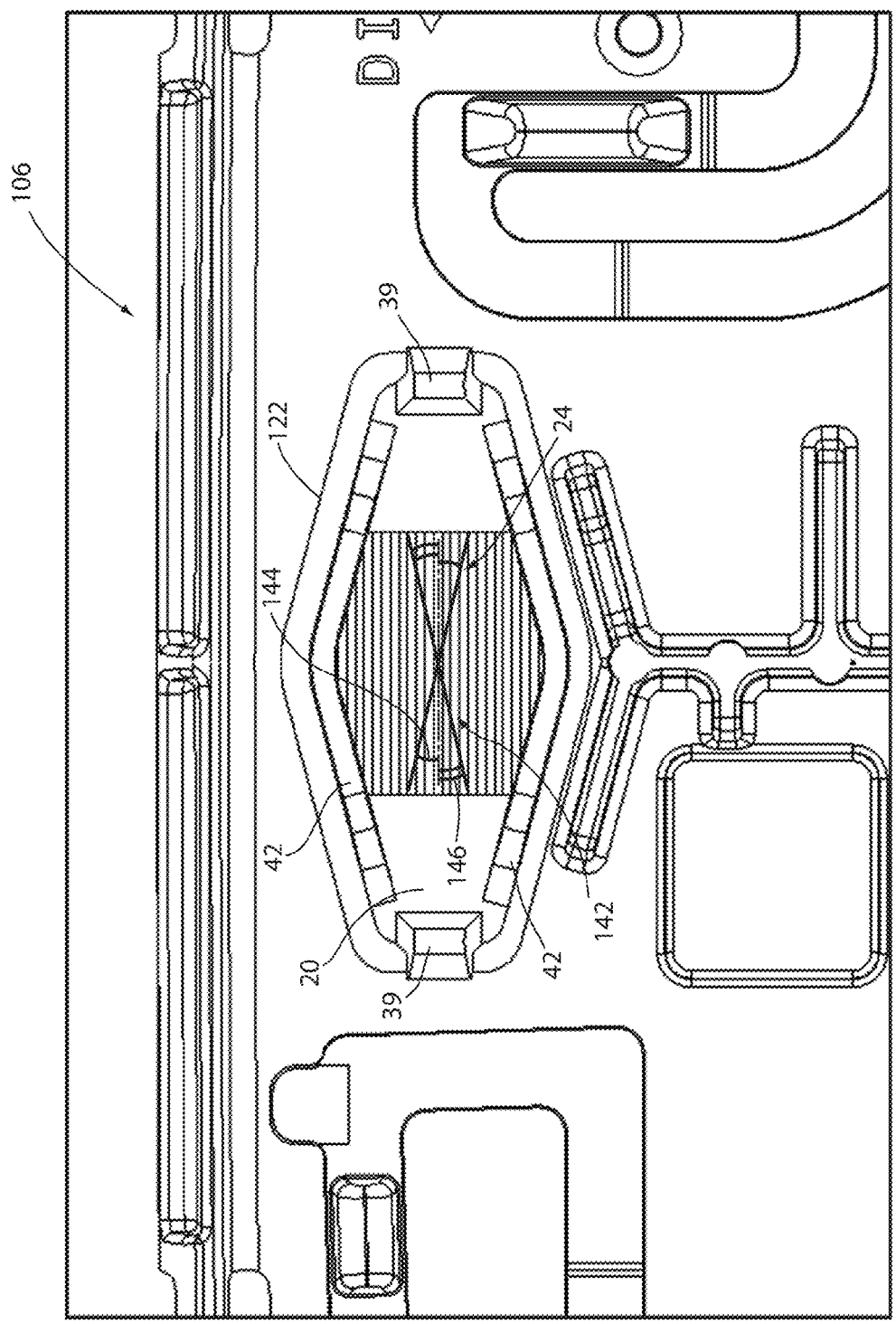
FIG. 6 is a partial rear plan view of the secondary optic shown with the light sensor hidden for clarity in accordance with the present disclosure.

Referring to FIG. 6, a rear view of the backplate 106 and the secondary optic 16 is shown with the housing 32, the PCB 108, the light sensor 14, and other various components of the rearview device mount 34 hidden for clarity. The plurality of snaps 39 and the plurality of baffles 42 are shown extending through the opening 122 from the rear surface 20. The plurality of horizontal flutes 24 are disposed on the rear surface 20 and are configured to project light toward the light sensor 14. In the implementation described in reference to FIG. 3B, the geometry of the semi-cylindrical portions 72 including the second radius 78 and the first arc angle 80 are configured such that a vertical field of view 142 extends in a rearward direction with respect to a normal forward operating direction of the vehicle that corresponds to a normal surface vector extending from the front surface 18.

A first angle 144 of the vertical field of view 142 extends along a first direction and a second angle of 146 of the vertical field of view 142 extends along a second direction. The first angle 144 is approximately 15 degrees upward from the normal surface vector extending from the front surface 18. The second angle 146 is approximately 15 degrees downward from the normal surface vector extending from the front surface 18. The first angle 144 and the second angle 146 may designate a total vertical field of view of approximately 30 degrees. In this example the first and second angles 144, 146 correspond to the same angle. However, in some implementations the first angle 144 may correspond to a different angle than the second angle 146. The angles of the various fields of view are generally determined by the geometry of the curved surface profiles 64, 74. Though the first angle 144 and the second angle 146 of the vertical field 142 of view are specifically discussed herein, an angle of the first angle and the second angle of a vertical field of view may generally be greater than 5 degrees, and in some implementations may be greater than 10 degrees. In an exemplary implementation, an angle of the first angle and the second angle may be greater than or equal to approximately 15 degrees.

The vertical field of view 142 is configured such that a glare light may be received from a rear portion of a vehicle, for example a rear windshield. The first and second angles 144, 146 of the vertical field 142 of view may vary based on the particular geometry for the particular design criteria for a particular application. Though a total vertical field of view 142 in this implementation is approximately 30 degrees in the rearward direction in relation to the vehicle, the vertical 142 field of view may vary widely, for example the vertical field of view may range from 10 to 180 degrees. In some implementations, a vertical field of view may be approximately 20 degrees or 25 degrees.

Figure 7:
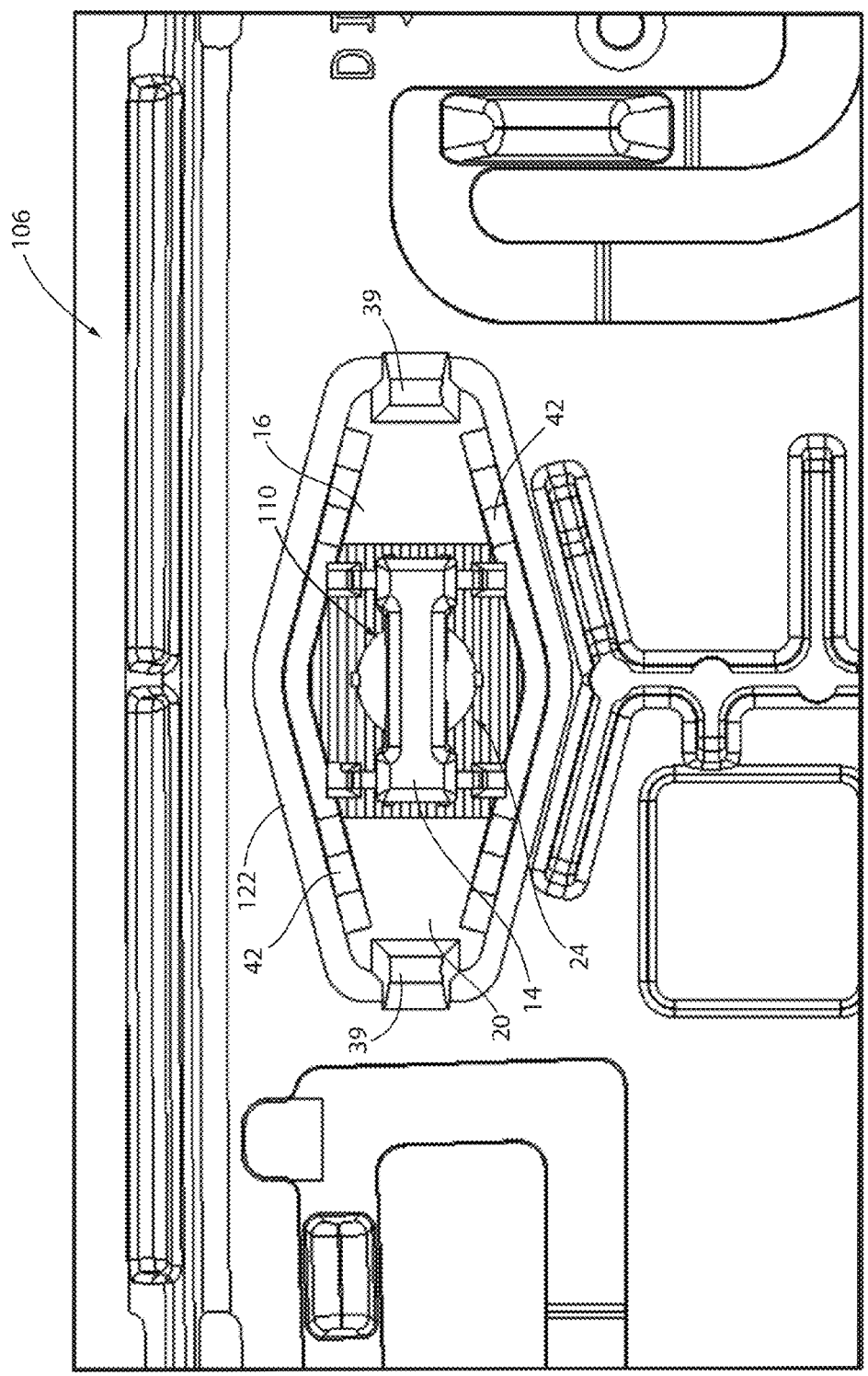
FIG. 7 is a partial rear plan view of the secondary optic shown with the light sensor in accordance with the present disclosure.

Referring to FIG. 7, a rear view of the backplate 106, the secondary optic 16, and the light sensor 14 is shown with the housing 32, the PCB 108, and other various components of the rearview device mount 34 hidden for clarity. The plurality of snaps 39 are shown extending through the opening 122. The plurality of stiffening ribs 42 extend from the rear surface 20 of the secondary optic 16 having the plurality of horizontal flutes 24. The sensory surface of the light sensor 14 is oriented such that the sensory surface is aligned with the horizontal flutes 24. The arrangement of the horizontal flutes 24 uniformly disposed across the rear surface 20 is configured to project light from the body portion 40 of the secondary optic 16.

As discussed previously, the rearview assembly 10 is configured such that light is transmitted through the at least one substrate 12, through the secondary optic 16, and is emitted from the horizontal flutes 24. The light sensor 14 is arranged such that light emitted from the horizontal flutes 24 is received by the light sensor 14. The light emitted from the horizontal flutes 24 is received across the sensory surface of the light sensor 14 to ensure that light is received and detected uniformly throughout a field of view projected from the secondary optic 16. In this configuration, the light sensor 14 is operable to measure the amount of light incident upon the at least one substrate 12 to monitor for a glare light project from a trailing vehicle.

The various implementations of the rearview assembly 10 discussed herein may be configured for a wide variety of applications. In an exemplary implementation, the light sensor 14 may be configured to control an electrochromic dimming to increase a contrast ratio between an LCD display and a reflective surface of a mirror in response to light incident upon the at least one substrate 12. In some implementations, the light sensor 14 may be configured to adjust the contrast or brightness of a display, for example an LCD video display, in response to the light incident upon the at least one substrate 12. Though specific implementations are described herein, the various novel features and arrangements disclosed herein may be flexibly configured to suit a variety of rearview sensing, reflecting, and/or displaying applications. Further details regarding the field of view of the secondary optic 16 are demonstrated in FIGS. 10A-10D.

Figure 8:
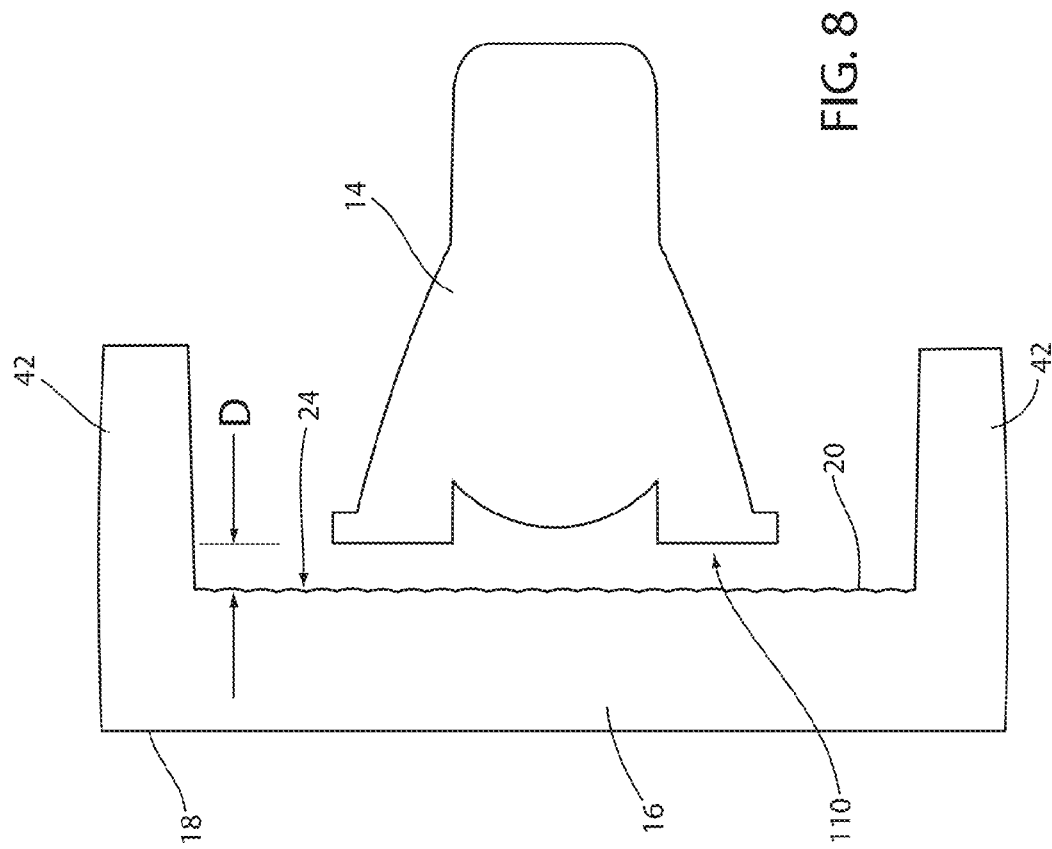
FIG. 8 is a detailed cross-sectional view of the secondary optic in the light sensor in accordance with the present disclosure.

FIG. 8 demonstrates further detail of the relative positions of the light sensor 14 and the secondary optic 16. The rear surface 20 of the secondary optic 16 is spaced a distance D from the sensory surface 110 of the light sensor 14. In some implementations, the distance D may vary from approximately 0.1 mm to approximately 10 mm. In some implementations, it may be advantageous to have the distance D the less than 5 mm. The distance D may be limited in order to decrease in overall depth of the rearview assembly 10. In an exemplary implementation, the distance D is less than 2 mm, and in a particular implementation the distance D is approximately 0.5 mm (approximately 0.52 mm).

Figure 9:
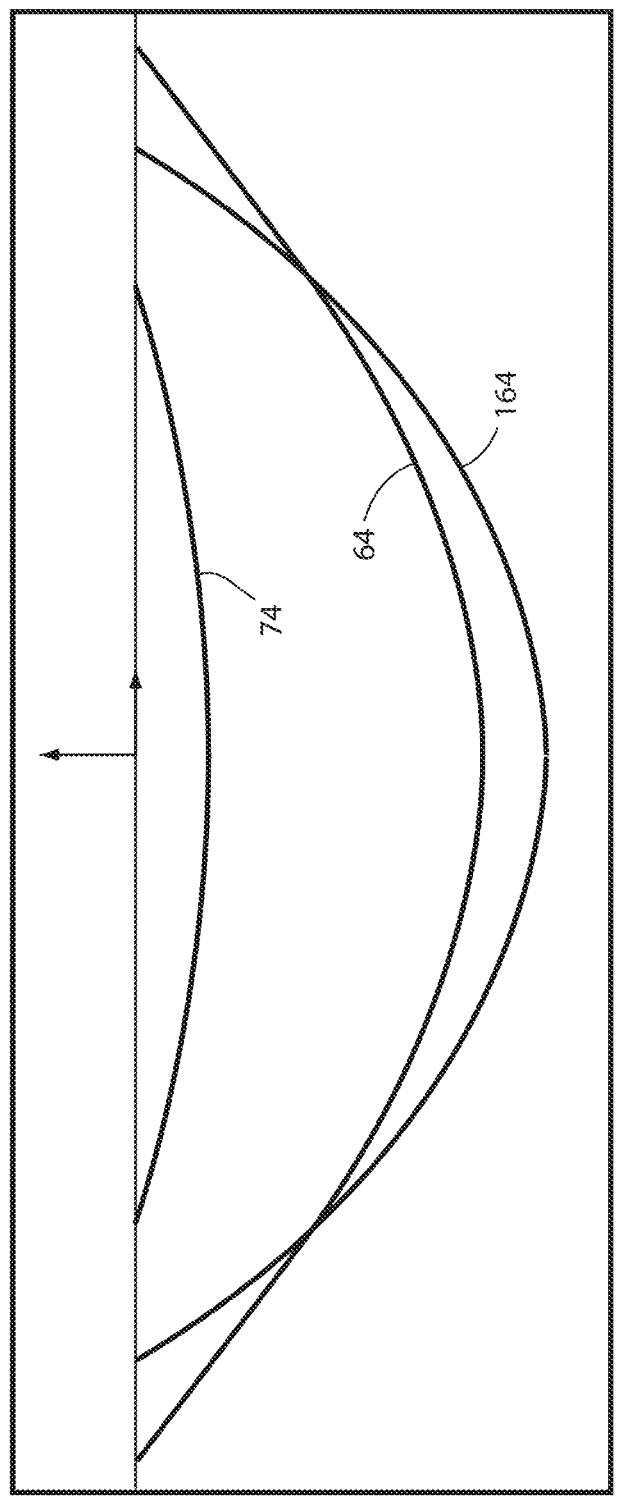
FIG. 9 is a graphical illustration of a surface profile of a flute portion of a secondary optic in accordance with the present disclosure.

Referring to FIG. 9, the curved surface profile 64 of the semi-cylindrical portion 62, the curved surface profile 74 of the semi-cylindrical portion 72 and an alternate profile 164 are shown in an overlay on a planar surface. The curved surface profile 64 corresponds to each of the plurality of vertical flutes 22 of the secondary optic 16. The curved surface profile 74 corresponds to each of the plurality of horizontal flutes 24 of the secondary optic 16. The example profile 164 is shown to demonstrate the effect of the curved surface profile 74 relative to the field of view and the surface reflectance of the secondary optic 16.

The example profile 164 generates a relatively wide field of view but has a high surface reflectance (approximately 40 percent) when implemented as a curved surface profile on the second surface 20 of the secondary optic 16. The example profile 164 is shown having a smaller radius of a semi-cylindrical portion of the vertical flutes compared to the curved surface profile 64. The curved surface profile 64 has a radius between the radius of the profile 74 and the radius of the example profile 164, but has a substantially uniform field of view when placed on the first surface 18 of the secondary optic 16. The curved surface profile 64 spreads out any light reflected back to the viewer of the rear vision device. The profile 74 has the smallest field of view of the three profiles 64, 74, 164, but provides an acceptable vertical field of view when placed on the second surface 20 of the secondary optic 16 and produces an overall low reflectance to the viewer of the rear vision device.

Though the particular curved surface profile 64 is discussed herein, it may be understood that the vertical flutes 22 of the secondary optic 16 disclosed may have a surface profile differs from the curved surface profile 64. The various implementations including the example profile 164 and the profile 74 are discussed to provide a clear understanding of the various implementations of the disclosed subject matter, some of which are introduced herein. The disclosure may provide for at least a significantly limited surface reflectance in comparison to the example profile 164. The various implementations discussed herein provide for a rearview assembly 10 having a display surface configured to generate a uniform appearance to a viewer and minimize distractions to the viewer due to the reflectance of the secondary optic 16.

Figure 10B:
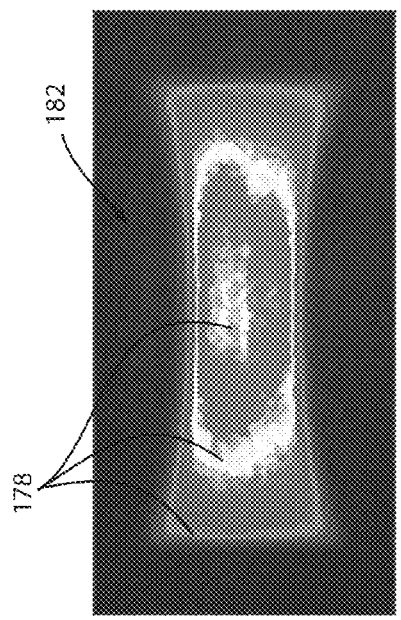
FIG. 10B is a graphical illustration of a first field of view of the light sensor in accordance with the present disclosure.
Figure 10D:
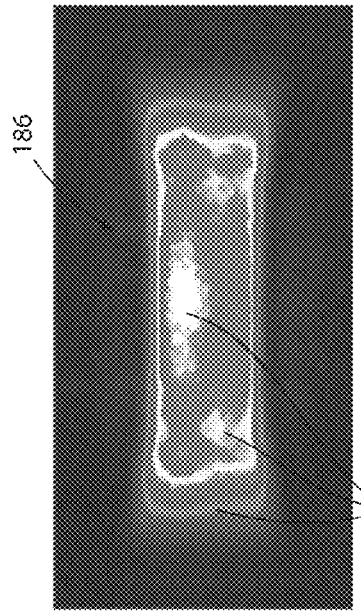
FIG. 10D is a graphical illustration of a third field of view of the light sensor in accordance with the present disclosure.
Figure 10A:
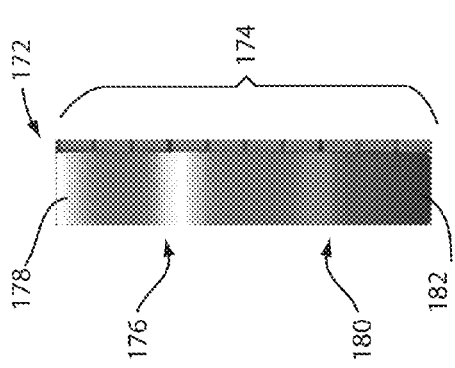
FIG. 10A is a graphical illustration of an intensity range bar demonstrating an intensity of a field of view shown in FIGS. 10B-10D in accordance with the present disclosure.

Referring now to FIGS. 10A-10D the fields of view corresponding to the example profile 164, the curved surface profile 74, and the curved surface profile 64 are illustrated. FIG. 10A is an illustration of a reference bar 172 having a shaded plurality of ranges 174 that correspond to each of the fields of view is demonstrated in FIGS. 10B-10D. A top portion 176 of the reference bar 172 corresponds to a high light intensity demonstrated by a light shade 178. A bottom portion 180 of the reference bar 172 corresponds to a low light intensity demonstrated by a dark shade 182. By comparing the shaded plurality of ranges 174 of the reference bar 172, the light received by the light sensor 14 from the secondary optic 16 may be compared to demonstrate the changes in a field of view as previously discussed.

Figure 10C:
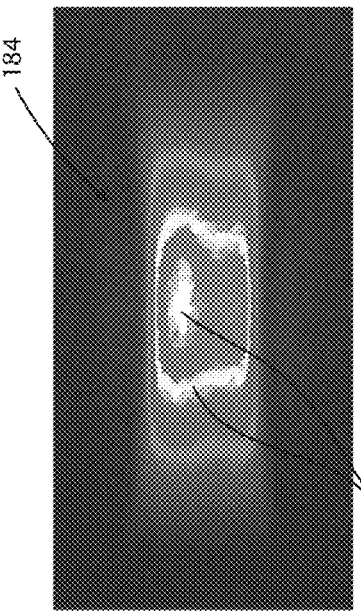
FIG. 10C is a graphical illustration of a second field of view of the light sensor in accordance with the present disclosure.

FIG. 10B illustrates a first field of view 182 corresponding to the curved surface profile 74 in a horizontal array on the first surface 18 and profile 164 in a vertical array on the second surface 20 of the secondary optic 16. The regions of the light shade 178 of the shaded plurality of ranges 174 demonstrate a relatively uniform and broad field of view. However, the surface reflectance corresponding to the optical system using profiles 74 and 164 in this arrangement is high (approximately 40% reflectance). FIG. 10C illustrates a second field of view 184 corresponding to the second example optical system using profile 164 in a vertical array on the first surface 18 and profile 74 in a horizontal array on the second surface 20 of the secondary optic 16. The regions of the light shade 178 are visibly reduced and significantly narrowed in comparison to those illustrated in FIG. 10B. The limited regions of the light shade 178 demonstrate a comparably poor field of view relative to the first field of view 182. Though the second field of view 184 of the second example optical system provides a decreased surface reflectance, the second field of view 184 is decreased significantly.

FIG. 10D illustrates a third example optical system with a third field of view 186 corresponding to the curved surface profile 64 being used in a vertical array on the first surface 18 and surface profile 74 in a horizontal array being used on the second surface 20. Similar to the first field of view 182, the third field of view 186 includes a broad and uniform field of view demonstrated by the regions of the light shade 178. Further, the surface reflectance corresponding to the third example optical system is only approximately 4 percent. In some implementations, the surface reflectance corresponding the first surface 18 of a secondary optic as discussed herein, may be less than 35%. In some implementations, the surface reflectance of a secondary optic may be less than 25%. In an exemplary implementation, the surface reflectance of a secondary optic may further be reduced to be less than 10%. Finally, in the implementation previously described in reference to the curved surface profile 64, the surface reflectance of the secondary optic 16 is less than 5%. The reduced surface reflectance of the secondary optic 16 of the rearview assembly 10 discussed herein provides for a display of the rearview assembly to appear uniform. The reduced surface reflectance further provides for a reduced visibility of shadows or inconsistencies corresponding to a secondary optic.

The thin-film stack as described herein may comprise a polymer-based film 302 may be extruded or molded, or fabricated using other known methods; it may comprise a single layer (such as a layer of a low-density polyethylene, see, e.g., U.S. Pat. No. 5,631,089) or be a multilayer film stack (such as a stack of alternating layers having high- and low refractive indices) some of the layers of which may be optically anisotropic (e.g., birefringent). For example, the film 302 may contain commercially available plastics such as acrylics, polycarbonates, silicone, polyester, polysulfone, polycyclic olefin, PVC, or the like having nominal indices of refraction from about 1.3 to about 1.8. The stack of layers with alternating refractive indices may be used to enhance the reflectance of light having a given polarization while simultaneously optimizing the transmittance of light having another polarization state. Such anisotropic layers may include, in one embodiment, a prismatically microstructured surface similar to that disclosed in U.S. Pat. No. 5,422,756 that facilitates the separation of the incident light into two components having orthogonal polarizations. In addition or alternatively, the film 302 may comprise a plurality of alternating polymeric layers of at least two types having, respectively, high and low refractive indices at one polarization and different high and low refractive indices at an orthogonal polarization. One example of such film, including alternating layers of crystalline naphthalene dicarboxylic acid polyester, was described in WO 95/17303. In yet another alternative embodiment, the multilayer polymer film 302 may comprise a layer that has a spatially oriented structure realized, for example, by stretching an otherwise isotropic polymer film in a chosen direction.

It is contemplated that the secondary optic as set forth herein may be used in conjunction with the concept set forth and claimed in U.S. patent application Ser. No. 13/764,971, U.S. Patent Application Publication Nos. 2013/0032704 and 2012/0330504, as well as U.S. Pat. No. 7,543,946. The present disclosure may be used with a mounting system such as that described in U.S. Pat. Nos. 8,201,800; 8,210,695; U.S. patent application Ser. Nos. 13/600,496; 13/527,375; 13/431,657; 13/402,701; 12/187,019, and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. No. 8,264,761; U.S. patent application Ser. Nos. 13/567,363; 13/405,697; 13/402,701; and 13/171,950, and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,201,800; 8,210,695; and U.S. patent application Ser. No. 13/271,745, which is hereby incorporated herein by reference in its entirety.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview assembly for use in a vehicle for providing a rearward view from the vehicle, the rearview assembly comprising:
    at least one substrate comprising a partially transmissive coating;
    a light sensor proximate the at least one substrate; and
    a secondary optic comprising:
    a first surface facing outward toward the at least one substrate;
    a plurality of vertical flutes proximate the first surface;
    a second surface facing inward toward the light sensor; and
    a plurality of horizontal flutes proximate the second surface, wherein the secondary optic is configured to control a field of view of the light sensor and the secondary optic is configured to have a reduced reflectance, and wherein an orientation of the plurality of vertical flutes and the plurality of horizontal flutes provide for the field of view with the reduced reflectance.

2. The assembly according to claim 1, wherein the vertical flutes are formed on the first surface.

3. The assembly according to claim 1, wherein the horizontal flutes are formed on the second surface.

4. The assembly according to claim 1, wherein each of the vertical flutes comprises a first curved surface profile.

5. The assembly according to claim 4, wherein the first curved surface profile comprises a first base radius, the first base radius having a range between 0.01 mm and 5 mm.

6. The assembly according to claim 1, wherein each of the horizontal flutes has a second curved surface profile.

7. The assembly according to claim 6, wherein the second curved surface profile comprises a second base radius, the second base radius having a range between 0.1 mm and 10 mm.

8. The assembly according to claim 1, wherein the plurality of vertical flutes is configured to receive light in a horizontal field of view extending greater than 30 degrees from a direction normal to the first surface along a horizontal plane.

9. The assembly according to claim 1, wherein the plurality of horizontal flutes are configured to receive light in a vertical field of view extending greater than 10 degrees from a direction normal to the first surface along a vertical plane.

10. The assembly according to claim 1, wherein the plurality of vertical flutes extends across the first surface proximate a perimeter formed by the first surface.

11. A rearview assembly for use in a vehicle for providing a rearward view from the vehicle, the rearview assembly comprising:
   a first substrate and a second substrate, wherein at least one of the first and second substrates include a partially transmissive coating;
   a light sensor disposed proximate the second substrate;
   a secondary optic disposed between the second substrate and the light sensor, the secondary optic comprising:
      a first surface facing outward toward the second substrate; and
      a second surface facing inward toward the light sensor, wherein the secondary optic controls the field of view of light received by the light sensor, and wherein the secondary optic provides for a reflectance of less than 30 percent in the direction outward toward the second substrate.

12. The assembly according to claim 11, wherein the first surface comprises a plurality of arc-shaped flutes.

13. The assembly according to claim 12, wherein the plurality of arc-shaped flutes extend vertically along the first surface.

14. The assembly according to claim 11, wherein the second surface comprises a plurality of arc-shaped flutes.

15. The assembly according to claim 14, wherein the plurality of arc-shaped flutes extend horizontally along the second surface.

16. The assembly according to claim 11, wherein the wherein the secondary optic includes a reflectance of less than 15 percent in the direction outward toward the second substrate.

17. A rearview assembly for use in a vehicle, the rearview assembly comprising:
   a housing configured to be mounted to the vehicle;
   a rearview element disposed in the housing for providing a rearward view from the vehicle, the rearview element comprising:
      at least one substrate, and
      a window formed in the at least one substrate;
   a light sensor proximate the at least one substrate, the light sensor having a sensory surface aligned with the window; and
   a secondary optic disposed between the at least one substrate and the light sensor, the
   a first surface facing outward toward the at least one substrate; and
   a second surface facing inward toward the light sensor, wherein the first surface comprises a plurality of vertical flutes and the second surface comprises a plurality of horizontal flutes, wherein an orientation of the plurality of vertical flutes and the plurality of horizontal flutes provide for a field of view with a reduced reflectance.

18. The assembly according to claim 17, wherein each of the vertical flutes is semi-cylindrical in shape having a curved surface extending outward toward the at least one substrate.

19. The assembly according to claim 17, wherein each of the horizontal flutes is semi-cylindrical in shape having a curved surface extending outward toward the light sensor.

20. The assembly according to claim 17, wherein the second surface is separated from the light sensor by less than 2 mm.

* * * * *

UNITED STATES PATENT AND TRADEMARK OFFICE
CERTIFICATE OF CORRECTION

| | | |
|---|---|---|
| PATENT NO. | : 9,434,311 B2 | Page 1 of 1 |
| APPLICATION NO. | : 14/185334 | |
| DATED | : September 6, 2016 | |
| INVENTOR(S) | : Lisowski et al. | |

It is certified that error appears in the above-identified patent and that said Letters Patent is hereby corrected as shown below:

In the Claims

Column 14, Claim 17, Line 1:
Delete the "return" after "vehicle,";

Column 14, Claim 17, Line 13:
After "the" insert --secondary optic comprising--;

Column 14, Claim 17, Line 13:
Delete the "return" after "the".

Signed and Sealed this
Ninth Day of May, 2017

Michelle K. Lee
*Director of the United States Patent and Trademark Office*